UNITED STATES PATENT OFFICE.

WILLIAM A. SCHWALBE, OF MOSINEE, WISCONSIN.

METHOD OF MAKING LEGUMINOUS FOOD.

No. 882,173.     Specification of Letters Patent.     Patented March 17, 1908.

Application filed November 19, 1906. Serial No. 344,118.

*To all whom it may concern:*

Be it known that I, WILLIAM A. SCHWALBE, a citizen of the United States, residing at Mosinee, in the county of Marathon and State of Wisconsin, have invented a new and useful Method of Making Leguminous Food, of which the following is a specification.

This invention relates to a method of making prepared food from peas, beans and other legumes.

The invention consists, generally stated, in first grinding the dried peas or beans into a coarse meal and sifting the meal to remove the shells or hulls; secondly in reducing the coarse meal by re-grinding the same; thirdly in incorporating a quantity of salt and thoroughly agitating or stirring the meal and until the parts are well blended; fourthly in sterilizing and partially cooking the meal by subjecting the same to dry steam at high pressure; and fifthly in thoroughly drying the resulting product to eliminate moisture and subsequently placing the same in suitable boxes or packages for use.

In carrying the procedure into effect any desired quantity of dried peas or beans is taken and reduced to a coarse meal in a suitable grinding machine and then sifted so as to remove the hull or shells. The coarse meal is then re-ground to render the same relatively fine and three tea-spoonfulls of salt added to each pound of meal and thoroughly incorporated therewith by stirring or agitating the same, after which the meal is sterilized and partially cooked by subjecting the meal to the action of dry steam at a high pressure, care being taken not to allow the meal to become soggy during the steaming or cooking operation. The product is then thoroughly dried by means of a blast of hot air or by placing the same in a suitable receptacle to which is fed a quantity of hot air, the product being subsequently packed in boxes or receptacles of the desired shape and size when it is ready for the market.

It will here be stated that the meal is subjected to the action of the hot air before the steam in the meal cools and condenses, so as to prevent the same from becoming soggy which would necessitate re-grinding the same.

In using the conserve in making soup a small quantity of the same is placed in a bowl or other suitable receptacle and sufficient boiling water added to give the same the proper consistency, salt and pepper being subsequently added to suit the taste.

Beans, peas and other legumina treated by the foregoing process retain their natural flavor and nutritious properties and if placed in an air tight receptacle may be kept for an indefinite period without deterioration.

Having thus described the invention what is claimed is:

1. The herein described method of making prepared food which consists in grinding dried legumes into a coarse meal, sifting the meal to remove the shells, reducing the coarse meal by regrinding the same, thoroughly stirring the material and incorporating a quantity of salt therewith, sterilizing and partly cooking the meal by subjecting the same to the action of dry steam at high pressure and subsequently drying the meal by an application of hot air to eliminate any possible moisture present.

2. The herein described method of making prepared food which consists in grinding dried peas or beans into a coarse meal, removing the shells, reducing the coarse meal by regrinding the same, thoroughly stirring the material and incorporating two tablespoons full of salt to each pound of meal, sterilizing and partly cooking the meal by subjecting the same to the action of dry steam at high pressure and subsequently drying the meal by an application of hot air to eliminate any possible moisture present.

In testimony that I claim the foregoing as my own, I have hereto affixed my signature in the presence of two witnesses.

WILLIAM A. SCHWALBE.

Witnesses:
  FRANK TASKUN,
  FRANK BESTE.